Figure 1:
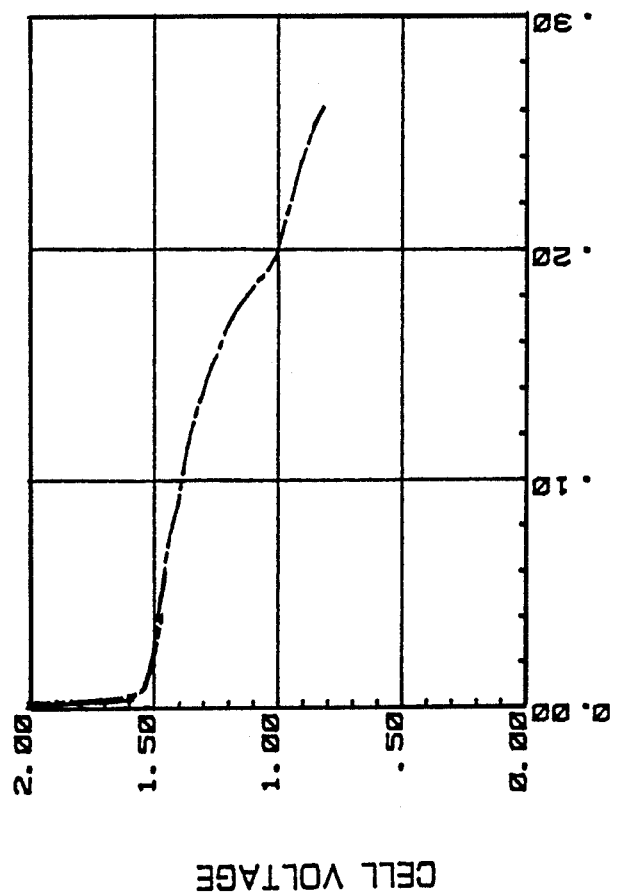

United States Patent [19]
Whitney et al.

[11] Patent Number: 4,833,050
[45] Date of Patent: May 23, 1989

[54] ELECTROCHEMICAL CELLS

[75] Inventors: Thomas A. Whitney, Medfield, Mass.; William L. Bowden, Nashua, N.H.; Arabinda N. Dey, Needham, Mass.

[73] Assignee: Duracell Inc., Bethel, Conn.

[21] Appl. No.: 125,502

[22] Filed: Nov. 25, 1987

[51] Int. Cl.$^4$ .............................................. H01M 4/48
[52] U.S. Cl. .................................... 429/194; 429/218; 429/220
[58] Field of Search ............... 429/218, 220, 191, 194

[56] References Cited
U.S. PATENT DOCUMENTS
4,268,588  5/1981  Lecerf et al. .................. 429/220

FOREIGN PATENT DOCUMENTS
0159568  12/1980  Japan .................. 429/218
0089070   5/1985  Japan .................. 429/220

Primary Examiner—Donald L. Walton
Attorney, Agent, or Firm—Ronald S. Cornell; James B. McVeigh

[57] ABSTRACT

This invention relates to electrochemical cells wherein the cathode comprises ceramics containing copper oxides characterized as perovskites.

22 Claims, 1 Drawing Sheet

CAPACITY, AMP-HOURS/GRAM OF $YBa_2Cu_3O_{6.8}$

ELECTROCHEMICAL CELLS

This invention relates to compounds useful as cathode active materials for electrochemical cells. In particular, these compounds can generally be described as perovskites. These materials are also classified as ceramics comprising copper oxides. Some of these materials are known to be superconductive at liquid nitrogen and higher temperatures.

The general formula of a perovskite is $M_6L_k$, wherein M is a metal or metals, L is a ligand such as halides or oxygen, and wherein $6 \leq k \leq 9$. When $k=9$ these compounds have the stoichiometry of a true perovskite such as $BaTiO_3$ which has an orthorhombic crystal structure and a metal to ligand ratio of 2:3. When $k<9$ these compounds can have crystal structures like a true perovskite but there are vacant sites in the unit cell. These compounds are designated as perovskites having oxygen defect sites. Thus, the perovskites with oxygen defect sites have ratios of metal to ligand of 1:1 down to but not including 2:3. When the ratio is 1:1 the crystal structure is generally tetragonal while ratios of 6:6.5 and lower are generally orthorhombic.

The compounds encompassed by this invention have the following general chemical formula:

$$L_vM_wCu_xO_yX_z$$

In accordance with this invention, L is a metal ion having a valence of +3 and being selected from the group consisting of scandium, yttrium, gallium an element of the lanthanide series (elements 57 through 71) set forth in the Periodic Chart of the Elements, mischmetal, and mixtures thereof; M is a metal ion having a valence of +2 and being selected from the group consisting of beryllium, magnesium, barium, strontium, calcium, or mixtures thereof; and X is a halogen selected from the group consisting of fluorine, chlorine, and bromine.

The compounds contemplated herein for use as cathode active materials are depicted by the above formula wherein the ratio of $(v+w+x):(y+z)$ ranges from 1:1 to 2:3. Generally v, w, and x are numbers greater than zero but less than six whose sum equals six; y and z are numbers wherein y can vary from 2 to 8 while z can vary from 0 to 6 and wherein $y+z$ always ranges from 6 to 9. In the preferred compounds $v=1$, $w=2$, $x=3$. Since copper is the only element present whose valence is not fixed in the above formula, the valence per copper atom varies directly as $y+z$ varies from 6 to 9. The lowest valence per copper atom is +1. However, the unusual property of the compounds contemplated herein is that the highest valence per copper atom is +3. Generally, $Cu^{+3}$ compounds are not stable and $Cu^{+2}$ is the highest valence. The following table shows how the valence per copper atom varies for the compound $YBa_2Cu_3O_yF_z$ (ie. X=fluorine) as $y+z$ varies from 6 to 8:

TABLE

| YBa₂Cu₃O_yF_z | | | average valence per copper atom |
|---|---|---|---|
| y | z | y+z | |
| 8 | 0 | 8 | +3 |
| 7 | 0 | 7 | +2.33 |
| 6.5 | 0 | 6.5 | +2 |
| 6 | 0 | 6 | +1.66 |
| 7 | 1 | 8 | +2.66 |
| 7 | 2 | 9 | +3 |
| 6 | 2 | 8 | +2.33 |

TABLE-continued

| YBa₂Cu₃O_yF_z | | | average valence per copper atom |
|---|---|---|---|
| y | z | y+z | |
| 6 | 3 | 9 | +2.66 |
| 5 | 1 | 6 | +1.33 |
| 2 | 6 | 8 | +1 |

From this it can be seen that the Cu atoms can be present as a mixture of copper ions having different valence states. The preferred compounds for use as cathodes are those which contain copper having a valence in excess of +2 since it is believed that copper is the species reduced during discharge (although it is not intended that the present invention be limited by this interpretation).

A preferred perovskite with oxygen defect sites is $YBa_2Cu_3O_y$ where $6.5 \leq y \leq 7$ and wherein the crystal structure is orthorhombic. While the identity of the discharge products of such a material is not yet known it is believed that copper is reduced on discharge, and that it is theoretically possible to reduce all of the copper to copper metal. When $y=7$ it would take 7 electrons to reduce all of the copper in the above yttrium-barium-copper compound. This 7 electron capacity corresponds to 0.242 A—Hr/gram of 1.45 A—Hr/cm³ since this material has a density about 6 g/cm³. This is more than adequate for use in high energy density electrochemical cells.

A common method of making the perovskite type materials comprises mixing a stoichiometric amount of an $L_2O_3$ compound, a $MCO_3$ compound (wherein L and M are metal ions as described above), and CuO. When the "1:2:3" perovskite material is desired the above compounds are mixed in this molar proportion based on the metals. The mixture is then heated to 950° C. for 40 hours, then cooled to room temperature, and then further mixed by grinding. This heating, cooling, grinding step is repeated two more times. The resulting material generally has a composition of $L_1M_2Cu_3O_y$ wherein y is greater than 6.5 which indicates that the average valence of the copper ion is greater than 2. Increasing the amount of $Cu^{+3}$ present is achieved by heating the above material between 350° C. and 450° C. in air. Preferably the heating is carried out in a pure $O_2$ atmosphere. Preferably, the material is heated between 400°–440° C. in an oxygen atmosphere for 24 hours which results in increasing y to about 7. Once this oxygen level is obtained the temperature is dropped to between 150°–250° C.. The rate at which the temperature is reduced has an effect on the growth of the orthorhombic phase crystals. Thus, a rate of cooling of no more than one degree C per minute and preferably no more than 0.5 degree C per minute can be used to enhance the presence of these desirable materials. Material which is not heated in this manner is useful as cathode material. It is preferred, however, to use material having high y values.

Any material having a reduction potential more negative than the standard hydrogen potential can be used as an anode material. Preferably, the anode will be an alkali metal such as lithium, sodium, potassium, rubidium, and cesium; an alkaline earth metal such as magnesium and calcium; aluminum; zinc, or cadmium, and mixtures and alloys thereof.

The choice of electrolyte depends on the particular perovskite used. For those which are stable in water, conventional aqueous solvents can be used provided the anode material is also stable in water. Some of the perovskites with oxygen defect sites encompassed by this invention are known to oxidize water and therefore, nonaqueous electrolytes are used with these materials. The nonaqueous electrolytes are also the electrolytes of choice when the anode comprises an alkali metal such as lithium. Suitable nonaqueous solvents are include straight chain and cyclic ethers, cyclic esters, sulfones, sulfur dioxide, pyrroles, formates, and oxazoles. Specific examples include dimethoxyethane, dioxolane, substituted dioxolanes, propylene carbonate, gamma-butyrolactone, sulfolane, 2-methyltetrahydrofuran, tetrahydrofuran, diglyme, 3-methyl-2-oxazolidinone, methyl formate, and N-methylpyrrole. The electrolytes described in U.S. Pat. No. 4,670,363, the disclosure of which is incorporated herein by reference, are also suitable.

In addition to the fluid electrolytes discussed above, the perovskite type cathode materials encompassed by this invention can be used with solid ionic, glass, or polymeric electrolytes to make solid state cells. When the anode material comprises lithium suitable solid ionic electrolytes include $Li_3N$, $Li_3N$—$LiI$—$LiOH$, $Li$—$\beta$—$Al_2O_3$, $LiI$, $LiI.H_2O$, $LiBr$, $LiI$—$Al_2O_3(40\%)$, $LiI$—$LiOH$—$Al_2O_3$ and the like. Solid electrolytes of the glass type include $Li_5AlO_4$, $Li_5GaO_4$, $Li_5BiO_4$, $LiTaO_3$, $LiNbO_3$, $Li_2GeS_3$. Polymeric electrolytes include those comprising poly(propylene oxide), poly(ethylene oxide), or mixtures thereof and the like.

Appropriate electrolyte salts include any of the conventional salts used in aqueous and non-aqueous electrochemical cells. Suitable salts for use in nonaqueous electrolytes include those having anions such as hexafluoroarsenate, tetrafluoroborate, tetrachloroaluminate, tetrachlorogallate, trifluoromethane sulfonate, perchlorate, hexafluorophosphate, and the like. Generally, although not necessarily, the cations of these salts are comprised of the metal or metals being used as anode material.

A separator material is commonly employed between the anode and the cathode. Suitable separators include porous polymeric films, woven and non-woven fabrics comprising polymeric fibers, and membranes made of materials such as polypropylene, polyethylene, polytetrafluoroethylene, polyvinyl alcohol, polysulfones, polyvinyl chloride, polyvinyl fluoride, polyamides, polyphenyleneoxide-polystyrene copolymers, polycarbonates, or co-polymers thereof and the like.

Common adjuvants can be added to the perovskite cathodes contemplated herein. Carbonaceous materials such as graphite or carbon black can be added to enhance the conductivity. Such materials may not be needed at all if the perovskite is superconducting, however an amount of carbon 1–15% by weight is generally sufficient if needed to improve conductivity. Elastomeric binders such as polytetraflouroethylene can be added to help form coherent cathode structures. Generally 5–10% by weight of binder will form a flexible, coherent cathode. Conductive metal grids made of stainless steel, titanium, tantalum, nickel and the like can be used as support structures and current collectors for the cathode material.

Further features and advantages of the present invention will be evident from the following examples in which:

FIG. 1 is a voltage-capacity curve of a cell incorporating an oxygen limited perovskite as cathode active material.

EXAMPLE 1

A cathode active, perovskite with oxygen defect sites is prepared by mixing 11.3 grams of $Y_2O_3$, 39.5 grams $BaCO_3$, and 23.9 grams CuO. The mixture is placed in an alumina crucible and heated in air at 950° C. for 40 hours. The mixture is cooled over an 8 hour period to room temperature. The resulting cooled mixture is ground and then heated again in air at 950° C. for 40 hours. The mixture is again allowed to cool over an 8 hour period to room temperature. The mixture is again ground and heated in air at 950° C. for 40 hours and then cooled to room temperature. The product yield is 64.3 grams of a material which has the general formula $YBa_2Cu_3O_y$ wherein y is about 6.6.

EXAMPLE 2

An ML-950 size button cell is built employing a ceramic as cathode active material wherein the ceramic is initially prepared in the manner described in Example 1 and then heated in air at 400° C. for 40 hours to increase the value of y to about 6.8, giving a material with the formula $TBa_2Cu_3O_{6.8}$. A cathode mix is prepared by mixing 6 parts of the ceramic, 3 parts carbon, and one part polytetrafluoroethylene (all parts are parts by weight). After mixing, 100 mg of the mix is taken and pressed into a disc to fit inside the ML-950 cell casing. The anode comprises lithium foil and the electrolyte comprises 1 molar $LiAsF_6$ in a 1:1 (v/v) mixture of propylene carbonate and dimethoxyethane. The cell has an open circuit voltage of 1.8 volts. FIG. 1 shows a voltage/capacity curve generated using a 2000 ohm load. The cell is capable of delivering up to 0.22 A—Hr/gram of the ceramic to a 0.9V cutoff, which is about 92% of the theoretical capacity.

EXAMPLE 3

A batch of ceramic comprising copper oxides is prepared according to Example 1. The material is put into an oven having an essentially 100% oxygen atmosphere and heated to 440° C. for 24 hours. This heating is followed by a slow cool down of 0.5 degree per minute until 150° C. is reached. The oven is shut off and the material is allowed to slowly cool to room temperature in the oven. The resulting compound has a formula $YBa_2Cu_3O_y$ wherein y is 6.96.

EXAMPLE 4

The material from example 3 is used in combination with carbon and polytetrafluoroethylene, in the proportions given by Example 2, to prepare a cathode. An ML-950 size button cell is made using this cathode together with an anode and electrolyte as described in Example 2. This cell delivers a greater capacity per gram of perovskite to a 0.9V cutoff than the cell of Example 2 because there is more $Cu^{+3}$ present in the perovskite compound.

Other cathode formulations than that given in the above examples will provide useful cathodes. The amount of carbonaceous conductor added will of course depend on the conductivity of the particular perovskite with oxygen defect sites used. Compounds which are superconductive at or near room temperature will need little or no carbonaceous conductor.

While the examples discloses the preparation and use of one oxygen limited perovskite as a cathode active material it will be readily apparent to one skilled in the art that other perovskites with oxygen defect sites can be made and remain within the scope of this invention.

What is claimed is:

1. An electrochemical cell comprising an anode; a cathode; and an electrolyte; wherein said cathode comprises a ceramic comprising at least three different metal cations wherein one of the metal cations is copper and at least one anion comprising oxygen.

2. The electrochemical cell of claim 1 wherein said ceramic has the following general chemical formula:

$$L_v M_w Cu_x O_y X_z$$

L is a metal ion having a valence of +3 and being selected from the group consisting of scandium, yttrium, gallium, an element of the Lanthanide series (elements 57-71) set forth in the Periodic Chart of the Elements, mischmetal, and mixtures thereof; M is a metal ion having a valence of +2 and being selected from the group consisting of of beryllium, magnesium, barium, strontium, calcium, or mixtures thereof; and X is a halogen selected from the group consisting of fluorine, chlorine, and bromine; wherein v, w, and x are numbers greater than 0 and less than 6 wherein v+w+x equals 6; and wherein y is a number from 2 to 8, z is a number from 0 to 6 such that $6 \leq y+z \leq 9$.

3. The electrochemical cell of claim 2 wherein v=1, w=2, x=3.

4. The electrochemical cell of claim 3 wherein L is yttrium.

5. The electrochemical cell of claim 3 wherein M is barium.

6. The electrochemical cell of claim 3 wherein said anode is comprised of a metal selected from the group consisting of alkali metals, alkaline earth metals, aluminum, zinc, or cadmium, and mixtures thereof.

7. The electrochemical cell of claim 3 wherein the ceramic comprises $YBa_2Cu_3O_y$ wherein y ranges from 6.5 to 7 and the anode comprises lithium.

8. The electrochemical cell of claim 2 wherein the ceramic has an orthorhombic crystal structure.

9. The electrochemical cell of claim 8 wherein z=0 and y>6.5.

10. The electrochemical cell of claim 2 wherein the ceramic has a tetragonal crystal structure.

11. The electrochemical cell of claim 2 wherein the electrolyte is nonaqueous.

12. The electrochemical cell of claim 2 wherein the electrolyte is aqueous.

13. The electrochemical cell of claim 2 wherein the electrolyte is a solid electrolyte selected from the group consisting of ionic, glass, and polymeric electrolytes.

14. An electrochemical cell comprising an anode, a cathode, and a non-aqueous electrolyte; wherein said cathode comprises a perovskite with oxygen defect sites having the following general formula:

$$L_1 M_2 Cu_3 O_y$$

L is a metal ion having a valence of +3 and being selected from the group consisting of scandium, yttrium, gallium, an element of the Lanthanide series (elements 57-71) set forth in the Periodic Chart of the Elements, mischmetal, and mixtures thereof; M is a metal ion having a valence of +2 and being selected from the group consisting of of beryllium, magnesium, barium, strontium, calcium, or mixtures thereof; wherein y has a value between 6 and 8.

15. The electrochemical cell of claim 14 wherein L comprises yttrium.

16. The electrochemical cell of claim 14 wherein M comprises barium.

17. The electrochemical cell of claim 14 wherein said anode comprises a metal selected from the group consisting of lithium, sodium, potassium, cesium, rubidium, magnesium, calcium, aluminum, and mixtures thereof.

18. The electrochemical cell of claim 14 wherein said anode comprises lithium.

19. The electrochemical cell of claim 18 wherein L comprises yttrium and M comprises barium.

20. The electrochemical cell of claim 14 wherein the perovskite having oxygen defect sites has an orthorhombic crystal structure.

21. The electrochemical cell of claim 14 wherein the cathode further comprises a carbonaceous conductor.

22. The electrochemical cell of claim 21 wherein said perovskite with oxygen defect sites has a tetragonal crystal structure.

* * * * *